Patented May 16, 1939

2,158,117

UNITED STATES PATENT OFFICE 2,158,117

GELATIN TREATMENT

Donald P. Grettie, Chicago, Ill., assignor to Industrial Patents Corporation, Chicago, Ill., a corporation of Delaware No Drawing. Application August 23, 1938, Serial No. 226,327

14 Claims. (Cl. 99—130)

This invention relates to a method for improving the whipping qualities of gelatin.

An important characteristic of gelatin used in marshmallow formulas is the whipping quality.

One of the objects of this invention is to provide a new gelatin product of improved whipping qualities.

Another object of this invention is to provide a method for improving the whipping qualities of gelatin for use in such products as marshmallows without adversely affecting the viscosity or the jelly strength of the gelatin.

The present invention contemplates deaminization of gelatin by the conversion of the free amino groups in the gelatin molecule to alcohol groups. Deaminization of gelatin which is incorporated into a marshmallow formula results in obtaining a fast whip to produce a smooth, firm, and light product. The marshmallow will set rapidly and remains firm but fine textured and palatable after aging. The present invention may be practiced by adding nitrites to gelatin containing some free acid. The free acid liberates nitrous acid which acts upon the free amino groups in the gelatin molecule. An acid or low pH gelatin may be treated with nitrites without the addition of acids.

The treatment of gelatin with nitrites, for example, sodium nitrite, does not affect the jelly strength. Such treatment of gelatin has little effect upon the viscosity, the changes in viscosity being no more than that which would be expected due to changes in the pH of the treated gelatin. Table A which follows clearly substantiates these statements:

Table A

| Sample | Jelly strength in grams (bloom) | Viscosity in millipoises | pH |
|---|---|---|---|
| Acid cured gelatin (pH not adjusted) | 240 | 40 | 4.35 |
| Same treated in 10% solution with 1% of NaNO₃ then dried | 243 | 39 | 4.65 |
| Same treated in 10% solution with 2% of NaNO₃ then dried | 240 | 43 | 5.2 |

The effect of the treatment of gelatin with sodium nitrite imparts to the gelatin a somewhat darker color than the color of the original gelatin. The dark color may be removed or partially bleached by treating the gelatin with a strong reducing agent, such as sulphurous acid or hyposulphites.

Commercial gelatin is prepared by drying gelatin liquor obtained by extracting gelatin from suitable stock, such as bones, hide trimmings, and the like. In the use of commercial gelatin, water is added to form a colloidal solution or dispersion. Although I have practiced this invention on gelatin liquor, in the examples which follow deaminization was effected on commercial gelatin to which water had been added prior to incorporating the gelatin dispersion in the marshmallow formulas.

The comparative effects of the treatment of gelatin with sodium nitrite and with sodium nitrite followed by sulphurous acid on the whipping qualities of gelatin for use in marshmallow formulas are set forth in Table B:

Table B

| Sample | Weight per gallon of marshmallow whip after the following time intervals of whipping | |
|---|---|---|
|  | 8 minutes | 12 minutes |
| Marshmallow formula containing an acid cured gelatin #2 (pH not adjusted) | Pounds 3.16 | Pounds 2.86 |
| Same except gelatin was treated with .2 milliequivalent of NaNO₃ per gram of gelatin in 14 per cent solution 22 hours | 2.81 | 2.75 |
| Same except gelatin was treated with .2 milliequivalent of NaNO₃ per gram in 14 per cent solution 6 hours—then 16 hours with .2 milliequivalent of H₂SO₃ per gram of gelatin | 2.77 | 2.6 |

The effects of a similar treatment on a different sample of gelatin in which the gelatin solution was treated with sodium nitrite for a shorter period of time are set forth in Table C:

Table C

| Sample | Weight per gallon of marshmallow whip after whipping for the following time intervals | |
|---|---|---|
|  | 9 minutes | 18 minutes |
| Marshmallow formula containing acid cured gelatin (pH not adjusted) | Pounds 3.54 | Pounds 3.40 |
| Same except gelatin was treated in 14% solution for 18 hours with .2 milliequivalent NaNO₃ per gram of gelatin | 3.14 | 3.10 |
| Same except gelatin was treated in 14% solution for 18 hours with .2 milliequivalent of NaNO₃ per gram and then bleached with .2 milliequivalents of H₂SO₃ per gram of gelatin | 3.10 | 2.95 |

The improvement in the whipping qualities of gelatin for use in marshmallow formulas is readily apparent from an inspection of the tables. The improvement in the texture and speed of setting of the marshmallows produced by the use of deaminized gelatin is equally pronounced.

If an alkaline cured gelatin is employed, sufficient acid should be added to liberate nitrous acid when the gelatin is treated with a nitrite. It will be understood that sodium nitrite has been set out in the specific examples for illustrative purposes and that other nitrites may be employed in carrying out the present invention.

The action of nitrous acid upon the free amino groups in the gelatin molecule may be represented by the equation which follows, in which R represents the gelatin radical and $NH_2$ represents a free amino group:

It will be understood that any suitable method for the conversion of the free amino groups to alcohol groups may be employed.

I claim:

1. The method of treating gelatin which comprises deaminizing the gelatin.
2. The method of treating gelatin which comprises subjecting the gelatin to the action of nitrous acid.
3. The method of treating gelatin which comprises adding a nitrite thereto.
4. The method of treating gelatin which comprises adding sodium nitrite thereto.
5. The method of treating gelatin which comprises deaminizing the gelatin and bleaching the deaminized gelatin.
6. The method of treating gelatin which comprises subjecting the gelatin to the action of nitrous acid and thereafter bleaching the gelatin.
7. The method of treating an acid gelatin which comprises adding a nitrite thereto.
8. The method of treating an acid gelatin which comprises adding sodium nitrite thereto.
9. The method of treating an acid gelatin which comprises adding sodium nitrite thereto and thereafter adding a sulphite to the treated gelatin.
10. The method of treating gelatin which comprises acidifying the gelatin and subjecting the gelatin to the action of nitrous acid.
11. The method of treating gelatin which comprises acidifying the gelatin and adding a nitrite thereto.
12. The method of treating gelatin which comprises acidifying the gelatin and adding sodium nitrite thereto.
13. The method of treating gelatin which comprises acidifying the gelatin, adding a nitrite thereto, and thereafter bleaching the gelatin.
14. The method of treating gelatin which comprises acidifying the gelatin, adding sodium nitrite thereof, and thereafter adding a sulphite.

DONALD P. GRETTIE.

CERTIFICATE OF CORRECTION.

Patent No. 2,158,117.   May 16, 1939.

DONALD P. GRETTIE.

It is hereby certified that error appears in the printed specification of the above numbered patent requiring correction as follows: Page 2, second column, line 30, claim 14, for the word "thereof" read thereto; and that the said Letters Patent should be read with this correction therein that the same may conform to the record of the case in the Patent Office.

Signed and sealed this 4th day of July, A. D. 1939.

Henry Van Arsdale (Seal)   Acting Commissioner of Patents.

of gelatin for use in marshmallow formulas is readily apparent from an inspection of the tables. The improvement in the texture and speed of setting of the marshmallows produced by the use of deaminized gelatin is equally pronounced.

If an alkaline cured gelatin is employed, sufficient acid should be added to liberate nitrous acid when the gelatin is treated with a nitrite. It will be understood that sodium nitrite has been set out in the specific examples for illustrative purposes and that other nitrites may be employed in carrying out the present invention.

The action of nitrous acid upon the free amino groups in the gelatin molecule may be represented by the equation which follows, in which R represents the gelatin radical and $NH_2$ represents a free amino group:

It will be understood that any suitable method for the conversion of the free amino groups to alcohol groups may be employed.

I claim:

1. The method of treating gelatin which comprises deaminizing the gelatin.
2. The method of treating gelatin which comprises subjecting the gelatin to the action of nitrous acid.
3. The method of treating gelatin which comprises adding a nitrite thereto.
4. The method of treating gelatin which comprises adding sodium nitrite thereto.
5. The method of treating gelatin which comprises deaminizing the gelatin and bleaching the deaminized gelatin.
6. The method of treating gelatin which comprises subjecting the gelatin to the action of nitrous acid and thereafter bleaching the gelatin.
7. The method of treating an acid gelatin which comprises adding a nitrite thereto.
8. The method of treating an acid gelatin which comprises adding sodium nitrite thereto.
9. The method of treating an acid gelatin which comprises adding sodium nitrite thereto and thereafter adding a sulphite to the treated gelatin.
10. The method of treating gelatin which comprises acidifying the gelatin and subjecting the gelatin to the action of nitrous acid.
11. The method of treating gelatin which comprises acidifying the gelatin and adding a nitrite thereto.
12. The method of treating gelatin which comprises acidifying the gelatin and adding sodium nitrite thereto.
13. The method of treating gelatin which comprises acidifying the gelatin, adding a nitrite thereto, and thereafter bleaching the gelatin.
14. The method of treating gelatin which comprises acidifying the gelatin, adding sodium nitrite thereof, and thereafter adding a sulphite.

DONALD P. GRETTIE.

CERTIFICATE OF CORRECTION.

Patent No. 2,158,117.    May 16, 1939.

DONALD P. GRETTIE.

It is hereby certified that error appears in the printed specification of the above numbered patent requiring correction as follows: Page 2, second column, line 30, claim 14, for the word "thereof" read thereto; and that the said Letters Patent should be read with this correction therein that the same may conform to the record of the case in the Patent Office.

Signed and sealed this 4th day of July, A. D. 1939.

Henry Van Arsdale (Seal)    Acting Commissioner of Patents.